(12) United States Patent
Spicer et al.

(10) Patent No.: US 8,002,951 B2
(45) Date of Patent: Aug. 23, 2011

(54) FURNACE AND PROCESS FOR INCINERATING A DECOKE EFFLUENT IN A TWIN-TUBE-PLANE FURNACE

(75) Inventors: David B. Spicer, Houston, TX (US); Caleb M. Scherer, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 581 days.

(21) Appl. No.: 12/205,379

(22) Filed: Sep. 5, 2008

(65) Prior Publication Data

US 2010/0063342 A1  Mar. 11, 2010

(51) Int. Cl.
*C10G 9/12* (2006.01)
(52) U.S. Cl. ....... 196/122; 196/127; 208/48 R; 422/610; 422/214
(58) Field of Classification Search .................. 196/122, 196/127, 133; 422/610, 214; 208/48 R
See application file for complete search history.

(56) References Cited

U.S. PATENT DOCUMENTS

| | | | | |
|---|---|---|---|---|
| 4,224,108 A | * | 9/1980 | Takahashi et al. ............ | 196/122 |
| 4,629,413 A | | 12/1986 | Michelson et al. | |
| 5,092,761 A | | 3/1992 | Dinicolantonio | |
| 5,232,682 A | | 8/1993 | DuPont | |
| 5,446,229 A | * | 8/1995 | Taylor et al. .................. | 585/648 |
| 6,228,253 B1 | * | 5/2001 | Gandman ................. | 208/48 AA |
| 6,772,771 B2 | * | 8/2004 | Cai et al. ..................... | 134/22.16 |
| 6,852,294 B2 | * | 2/2005 | Doerksen ...................... | 422/200 |
| 6,877,980 B2 | | 4/2005 | Stephens et al. | |
| 7,625,480 B2 | * | 12/2009 | Beattie et al. ................. | 208/106 |
| 7,648,626 B2 | * | 1/2010 | Stell et al. ..................... | 208/130 |
| 2008/0128330 A1 | * | 6/2008 | McCoy et al. ........... | 208/48 AA |

FOREIGN PATENT DOCUMENTS

| | | |
|---|---|---|
| EP | 1 227 062 | 7/2002 |
| EP | 1 783 425 | 5/2007 |
| FR | 986 499 | 8/1951 |
| JP | 01 157402 | 6/1989 |

OTHER PUBLICATIONS

Gilbert L., "*Incinerating Decoke Effluent in an SC-1 Firebox*," KBR Olefins Conference 2005, pp. 1-27.
Gilbert L., "*Incinerating Decoke Effluent in an SC-1 Firebox*," KBR Olefins Conference 2005, pp. 1-27.

* cited by examiner

*Primary Examiner* — Nina Bhat (57) ABSTRACT

A furnace and method for the cracking of hydrocarbons. The furnace includes a radiant firebox, the radiant firebox comprising a furnace floor having a centerline, a plurality of decoke effluent injection nozzles mounted along or adjacent to the centerline for injecting decoke effluent upward into the radiant firebox, a plurality of burners arranged to form a first line of burners and a second line of burners, each line of burners positioned on opposing sides of the plurality of decoke effluent injection nozzles, a first plane of radiant coils spaced at a distance greater than the distance that the first line of burners is spaced from the centerline of the furnace floor and on the same side of the centerline as the first row of burners, and a second plane of radiant coils spaced at a distance greater than the distance that the second line of burners is spaced from the centerline of the furnace floor and on the same side of the centerline as the second row of burners.

20 Claims, 6 Drawing Sheets

FURNACE AND PROCESS FOR INCINERATING A DECOKE EFFLUENT IN A TWIN-TUBE-PLANE FURNACE

FIELD OF THE INVENTION

Disclosed herein are improvements in furnaces, such as those employed in the steam cracking of hydrocarbons. More particularly, disclosed herein are an improved process and apparatus for incinerating coke formed during the steam cracking of hydrocarbons.

BACKGROUND OF THE INVENTION

In the majority of oil refining processes employed today, coke is produced from petroleum residual fractions. Environmental regulations throughout the world require that entrained coke particles and volatile components in effluent streams be captured and disposed of to prevent releasing these materials into the environment. Frequently, such effluent is disposed of by burning the mixture in an incinerator.

Steam cracking is the major commercial process for the production of light olefins, especially ethylene and propylene. Light olefins are produced by the thermal cracking of hydrocarbon feeds at high temperature and low hydrocarbon partial pressure for short residence times.

In steam cracking, the hydrocarbon feed is first preheated and mixed with dilution steam in the convection section of the furnace. The temperature exiting the convection section is generally designed to be just at the point where significant thermal cracking begins. After preheating in the convection section, the vapor feed/dilution steam mixture is rapidly heated in the radiant section to achieve the desired thermal cracking. After the desired degree of thermal cracking has been achieved in the radiant section, the furnace effluent is rapidly quenched in either an indirect heat exchanger or by the direct injection of a quench oil stream.

An undesirable byproduct of the cracking process is often the deposition of carbon deposits, commonly referred to as "coke," on the inner surfaces of the radiant tubes of the furnace. Depending on the feedstock being cracked, coke may also be deposited in certain tubes in the convection section, or in the quench system of the furnace. Where feedstocks containing non-volatile hydrocarbons, commonly referred to as asphaltenes, resid or pitch, are processed in a furnace, including but not limited to those processes in which the convection section is equipped with an intermediate vapor-liquid separator, foulant or coke deposition may be expected on the internal surfaces of the separator.

There is a limit to the quantity of coke that can be deposited in a furnace and still permit normal-range furnace operation. Eventually the coke deposits begin to insulate or clog the tubes and must be removed before either the maximum radiant tube metal temperature (TMT) is reached, the maximum radiant coil pressure drop is reached, the maximum convection section pressure drop is reached, the maximum quench system pressure drop is reached, or, in the case where the furnace effluent is quenched in a steam generating quench exchanger, the maximum quench exchanger outlet temperature is reached.

The effluent from steam-air decoking comprises steam, air, CO, $CO_2$ and uncombusted coke particles. Historically, the effluent from steam-air decoking was directed to a decoke cyclone or decoke drum, where the coke particles were removed and the vapor products rejected to the atmosphere via a decoke vent stack. Depending on the design of the decoke drum or cyclone, a water-wash stream may be used to prevent coke particles accumulating on the walls of the drum. Coke particles are collected from the bottoms of the decoke drum and may be disposed of by land-fill, as a by-product, or incineration.

More recently, furnace designs have become available that direct the effluent from the steam-air decoke back to the firebox of the furnace rather than to a decoke drum. In this way the CO in the decoke effluent steam is converted to $CO_2$, and the intent is that any unburned coke particles will be incinerated.

In such designs, a decoke effluent stream is injected through one or more nozzles in the floor of the furnace to maximize the residence time for incineration of coke particles in the radiant firebox. A typical arrangement for the injection of decoke effluent into a single-tube-plane firebox is illustrated in FIG. 1.

Figure 1:
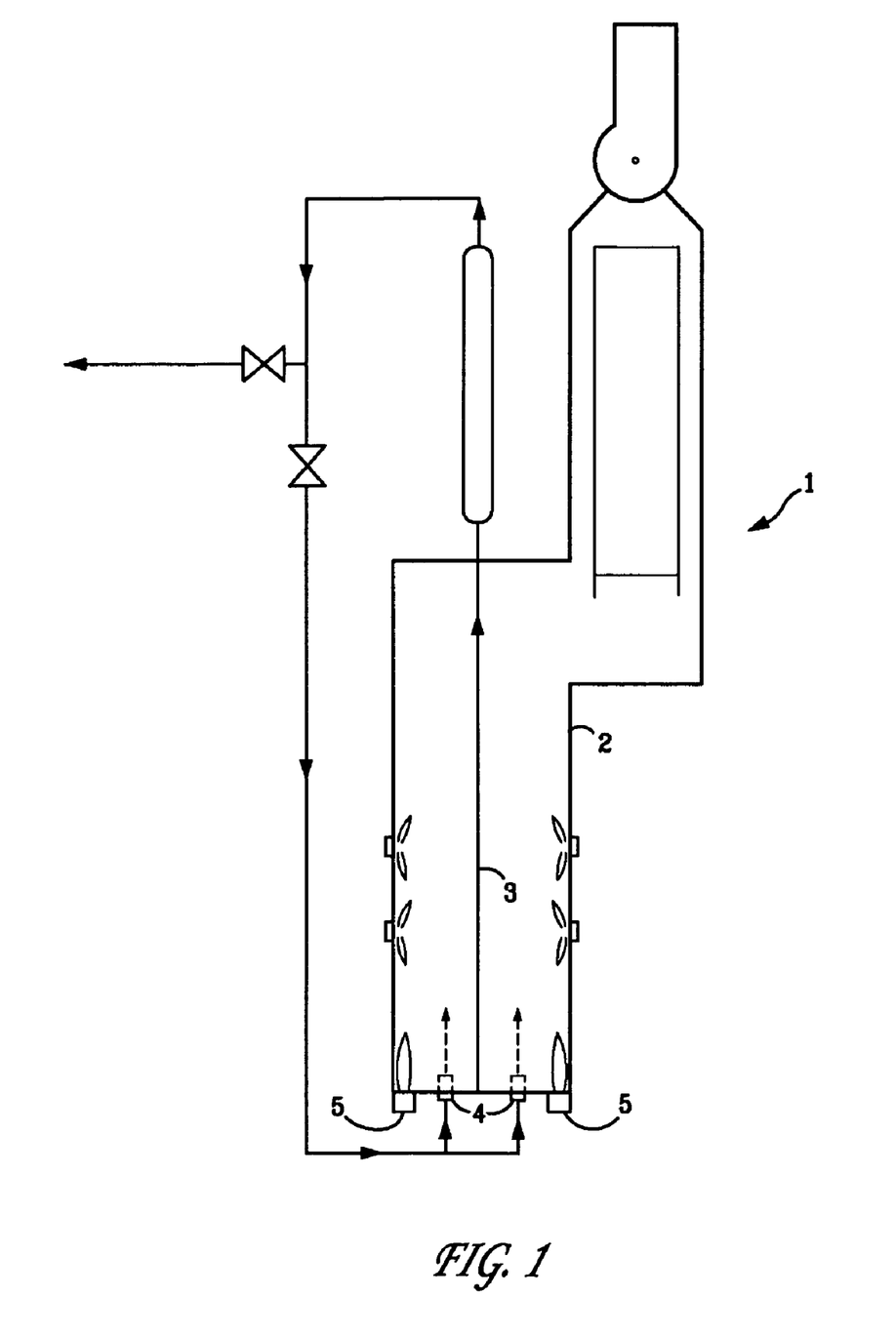
FIG. 1 is a schematic of a conventional furnace arrangement for injecting decoke effluent into a single-tube-plane furnace firebox.

As illustrated in FIG. 1, steam-air-decoke effluent is injected vertically into the radiant firebox through nozzles 4 mounted in the floor of the furnace. On one side of the injected decoke effluent stream is the flame from furnace floor mounted burners 5. On the other side of the decoke effluent stream is the plane of radiant tubes 3 being decoked. In such designs, the decoke effluent is injected into the radiant firebox 2 with a flame on one side and the cooler radiant tubes 3 on the other side.

In furnace designs of the type depicted in FIG. 1, there exists the potential for erosion of the radiant wall refractory by the abrasive coke particles as the turbulent decoke effluent stream expands after leaving the injection nozzles. Moreover, it can be undesirable to inject the decoke effluent stream in close proximity to the radiant tubes of the furnace, as the tubes are the coolest surface existing in the radiant firebox and may retard the combustion of the coke particles.

Therefore, what is needed is an improved furnace configuration that enables the injection of decoke effluent into the firebox without the deficiencies of prior designs.

SUMMARY OF THE INVENTION

Disclosed herein, in one aspect, is a furnace of a type such as those used for the cracking of hydrocarbons. In one aspect of the invention, a furnace is provided that includes a radiant firebox, the radiant firebox comprising a furnace floor having a centerline, a plurality of decoke effluent injection nozzles mounted along or adjacent to the centerline for injecting decoke effluent upward into the radiant firebox, a plurality of burners arranged to form a first line of burners and a second line of burners, each line of burners positioned on opposing sides of the plurality of decoke effluent injection nozzles, a first plane of radiant coils spaced at a distance greater than the distance that the first line of burners is spaced from the centerline of the furnace floor and on the same side of the centerline as the first row of burners, and a second plane of radiant coils spaced at a distance greater than the distance that the second line of burners is spaced from the centerline of the furnace floor and on the same side of the centerline as the second row of burners.

In one form, a second plurality of burners are arranged along at least two parallel lines to form a third line of burners and a fourth line of burners, each line of burners spaced a substantially equal distance from the centerline of the furnace floor at a distance greater than the distance that the first plane of radiant coils and the second plane of radiant coils are spaced from the centerline of the furnace floor, respectively. In another form, the plurality of burners includes premix staged air burners.

In yet another form, the premix staged air burners of the plurality of burners each include a primary air chamber; a burner tube having an upstream end, a downstream end and a venturi intermediate the upstream and downstream ends; a burner tip mounted on the downstream end of the burner tube adjacent a first opening in the furnace, so that combustion of the fuel takes place downstream of the burner tip; and a fuel orifice located adjacent the upstream end of the burner tube, for introducing fuel into the burner tube. In still another form yet, the upstream end of the burner tube receives fuel and flue gas, air or mixtures thereof and each the burner further includes at least one passageway having a first end at a second opening in the furnace for admitting flue gas and a second end adjacent the upstream end of the burner tube.

In another aspect, provided is a method for incinerating a decoke effluent stream of a furnace for the production of ethylene, the furnace including (i) a radiant firebox having a furnace floor, the furnace floor having a centerline, (ii) a plurality of decoke effluent injection nozzles mounted along or adjacent to the centerline for injecting decoke effluent upward into the radiant firebox (iii) a plurality of burners arranged to form a first line of burners and a second line of burners, each line of burners positioned on opposing sides of the plurality of decoke effluent injection nozzles; (iv) a first plane of radiant coils spaced at a distance greater than the distance that the first line of burners is spaced from the centerline of the furnace floor and on the same side of the centerline as the first row of burners; (v) a second plane of radiant coils spaced at a distance greater than the distance that the second line of burners is spaced from the centerline of the furnace floor and on the same side of the centerline as the second row of burners. The method includes the step of injecting decoke effluent upward into the radiant firebox along the centerline of the furnace. In another form, the above features are provided without an accompanying decrease in burner stability. These and other features will be apparent from the detailed description taken with reference to accompanying drawings.

BRIEF DESCRIPTION OF THE DRAWINGS

Further explained is provided in the description that follows with reference to the drawings illustrating, by way of non-limiting examples, various forms, wherein.

DETAILED DESCRIPTION OF PREFERRED FORMS

Although the forms disclosed herein are described in terms of use within a furnace or an industrial furnace such as for the production of ethylene, it will be apparent to one of skill in the art that the teachings provided herein also have applicability to other process components and methods, such as, for example, thermal pyrolysis or cracking of other feeds, refining, boilers. Thus, the term furnace herein shall be understood to mean furnaces, boilers and other applicable apparatus, process components, and methods.

Figure 2:
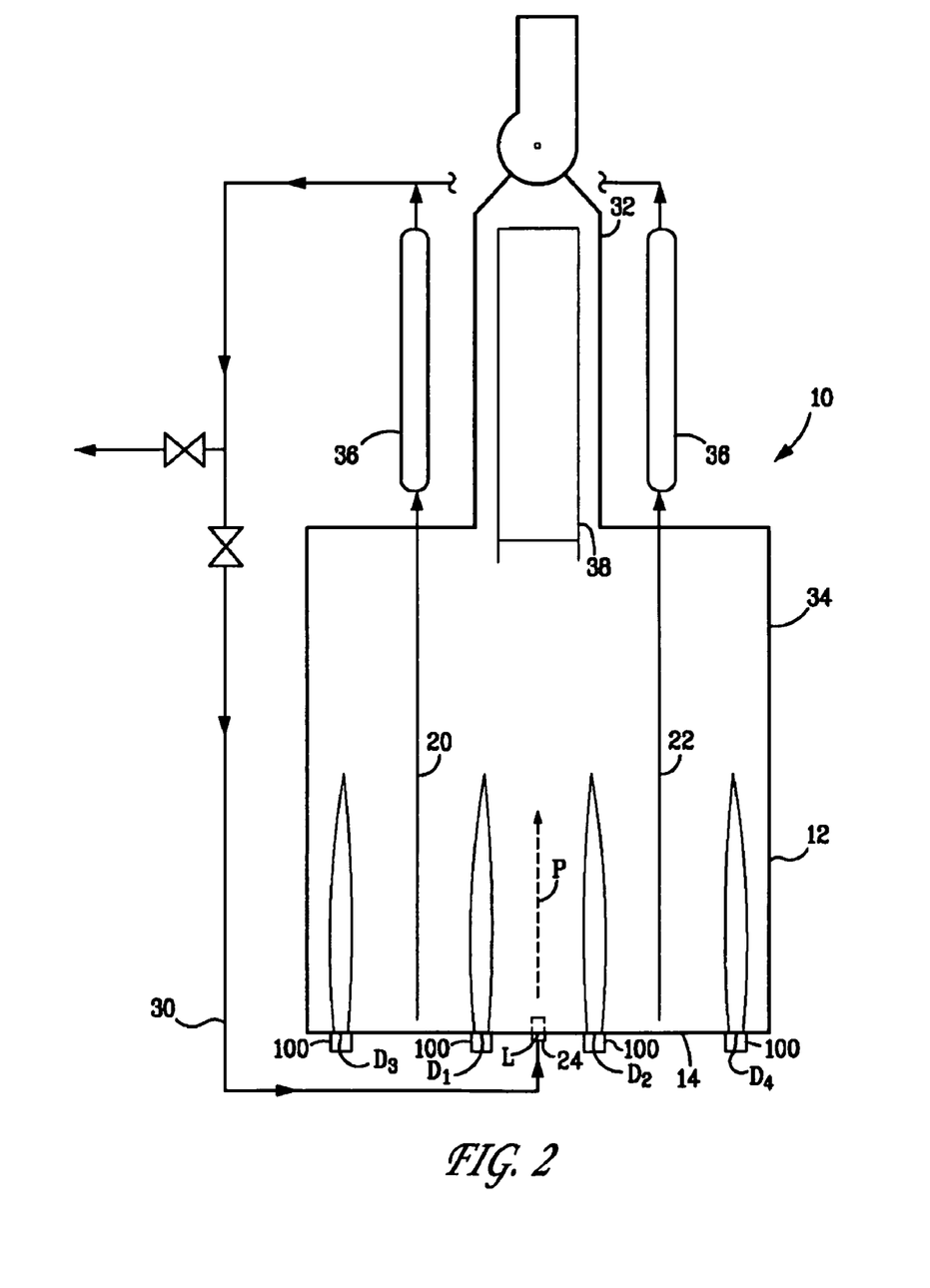
FIG. 2 is a schematic of a furnace arrangement, in accordance herewith, for injecting decoke effluent into a double-tube-plane furnace firebox.
Figure 3:
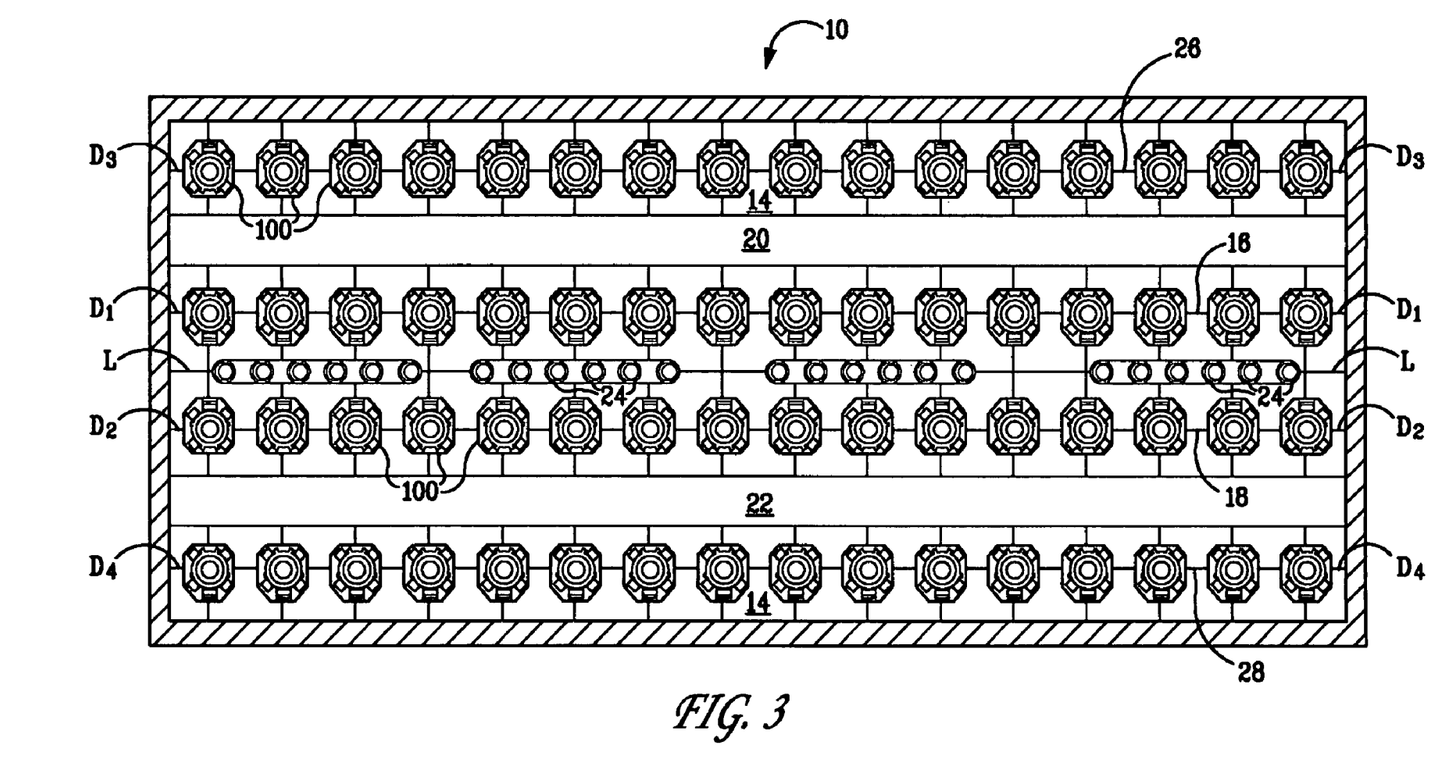
FIG. 3 is a plan view of a furnace floor showing a plurality of decoke effluent injection nozzles mounted along the centerline for injecting decoke effluent upward into the radiant firebox.

Referring now to FIGS. 2 and 3, a non-limiting exemplary embodiment of a furnace 10 is illustrated. Furnace 10 may be of a type used in the production of ethylene. Furnace 10 includes a radiant firebox 12, radiant firebox 12 having a furnace floor 14 having a centerline L. The use of the term "centerline" is meant to encompass its broadest reasonable interpretation. As such, "centerline" is meant to refer to a line that substantially passes through roughly the center of furnace floor 14. Centerline L may be of a width of about a foot or less, for the purposes of the instant disclosure. As illustrated in FIG. 3; a plurality of burners 100 is arranged along two parallel lines $D_1$ and $D_2$ to form a first line of burners 16 and a second line of burners 18, each line of burners spaced a substantially equal distance from the centerline L of furnace floor 14 and on opposing sides of the centerline L.

A first plane of radiant coils 20 is arranged parallel to a plane P passing through the centerline L of the furnace floor 14 and perpendicular to the furnace floor 14. As illustrated in FIG. 3, first plane of radiant coils 20 is spaced at a distance greater than the distance that the first line of burners 16 is spaced from the centerline L of the furnace floor 14 and on the same side of the centerline L as the first row of burners 16. A second plane of radiant coils 22 is arranged parallel to plane P passing through the centerline L of furnace floor 14 and perpendicular to furnace floor 14. Second plane of radiant coils 22 is spaced at a distance greater than the distance that the second line of burners 18 is spaced from the centerline L of furnace floor 14 and on the same side of the centerline L as the second row of burners 18.

Still referring to FIGS. 2 and 3, and a plurality of decoke effluent injection nozzles 24 is mounted along the centerline L. Decoke effluent injection nozzles 24 are provided for the injection of decoke effluent upward into radiant firebox 12. The plurality of decoke effluent injection nozzles 24 are fed decoke effluent through distribution piping 30 to distribute coke among the decoke effluent injection nozzles 24.

In one form, furnace 10 may also include a second plurality of burners 100 arranged along at least two parallel lines $D_3$ and $D_4$ to form a third line of burners 26 and a fourth line of burners 28, each line of burners spaced a substantially equal distance from the centerline L of the furnace floor 14 at a distance greater than the distance that the first plane of radiant coils 20 and the second plane of radiant coils 22 are spaced from the centerline L of the furnace floor 14, respectively.

In operation of furnace 10, hydrocarbon feed is first preheated and, in the case of liquid feeds commonly at least partially vaporized, and mixed with dilution steam in the convection section 32 of furnace 10. The temperature exiting convection section 32 is generally designed to be at or near the point where significant thermal cracking commences. Typically, for example, this temperature is about 1050° F. (565° C.) to about 1150° F. (620° C.) for gas-oil feeds, about 1150° F. (620° C.) to about 1250° F. (675° C.) for naphtha feeds, and about 1250° F. (675° C.) to about 1350° F. (730° C.) for ethane feed. After preheating in convection section 32, a vapor feed/dilution steam mixture is typically rapidly heated in the radiant section 34 to achieve the desired level of thermal cracking. The coil outlet temperature (COT) of radiant section 34 commonly can be in the range of from 1450° F. (790° C.) to about 1500° F. (815° C.) for gas oil feeds, about 1500° F. (815° C.) to about 1600° F. (870° C.) for naphtha feeds, and about 1550° F. (845° C.) to about 1650° F. (900° C.) for ethane feeds. After the desired degree of thermal cracking has been achieved in radiant section 34, the furnace effluent is rapidly quenched in either an indirect heat exchanger 36 and/or by the direct injection of a quench fluid stream (not illustrated).

As mentioned above, regardless of the feedstock being cracked, over time an undesirable but largely unavoidable byproduct of the cracking process is the deposition of carbon deposits (coke) on the inner surfaces of the radiant coils 20 and 22 of furnace 10. Depending on the feedstock being cracked, coke may also be deposited in the convection coils 38 of convection section 32, or in the quench system 36 of furnace 10. For feedstocks containing non-volatile hydrocarbons, commonly referred to as asphaltenes, resid, or pitch, which are processed in a furnace in which the convection section is equipped with an intermediate vapor-liquid separator, coke deposition may also be expected on the internal surfaces of the separator.

As may be appreciated, the furnace designs disclosed herein enable incineration of unburned coke particles of a decoke effluent stream. The decoke effluent stream is injected into the furnace radiant section fire box in close proximity to the flames produced by at least the adjacent plurality of burners 100 in the floor of furnace 10. Such close proximity provides maximum heating and oxidation to the coke combustion process. As may be appreciated by those skilled in the art, it is undesirable to inject the decoke effluent stream in close proximity to radiant coils 20 and 22 of furnace 10, as radiant coils 20 and 22 provide the coolest surfaces existing in the radiant firebox 12 and such close proximity may retard the combustion of the coke particles.

As can be seen from FIG. 1, in a typical single-radiant tube plane firebox 2, there exists no option but to inject the decoke effluent into radiant firebox 2 with a flame on one side and the cooler radiant coils on the other side. If the decoke effluent stream is injected too close to a wall of radiant firebox 2 in an effort to minimize the cooling effect of the radiant coils 3, there exists the potential for erosion of radiant wall refractory (not illustrated) by the coke particles as the decoke effluent stream expands after leaving the floor injection nozzles 4.

Advantageously, the furnaces and methods disclosed herein permit the injection of decoke effluent into the firebox so that maximum heating from the burners may be achieved, minimum cooling from the radiant coils may be experienced, and the potential for erosion of the radiant wall refractory may be essentially eliminated.

In various exemplary embodiments, the plurality of burners 100 of furnace 10 may include raw gas burners, staged-fuel burners, staged air burners, premix staged air burners or combinations thereof. In another form the plurality of burners 100 of furnace 10 may include premix staged air burners and optionally with combinations including the preceding listed burners. Examples of premix staged air burners may be found in U.S. Pat. Nos. 4,629,413, 5,092,716, and 6,877,980, the contents of which are hereby incorporated by reference in their entirety. With burners of these types, tall flames are produced and commercial experience has confirmed there is no need for supplementary wall mounted burners. While the third line of burners 26 and the fourth line of burners 28 may of the same type as the first line of burners 16 and the second line of burners 18, flat-flame burners may be employed the third line of burners 26 and the fourth line of burners 28. As those skilled in the art will readily understand, a flat-flame burner is one that is typically stabilized, at least in part, by the furnace wall.

Figure 4:
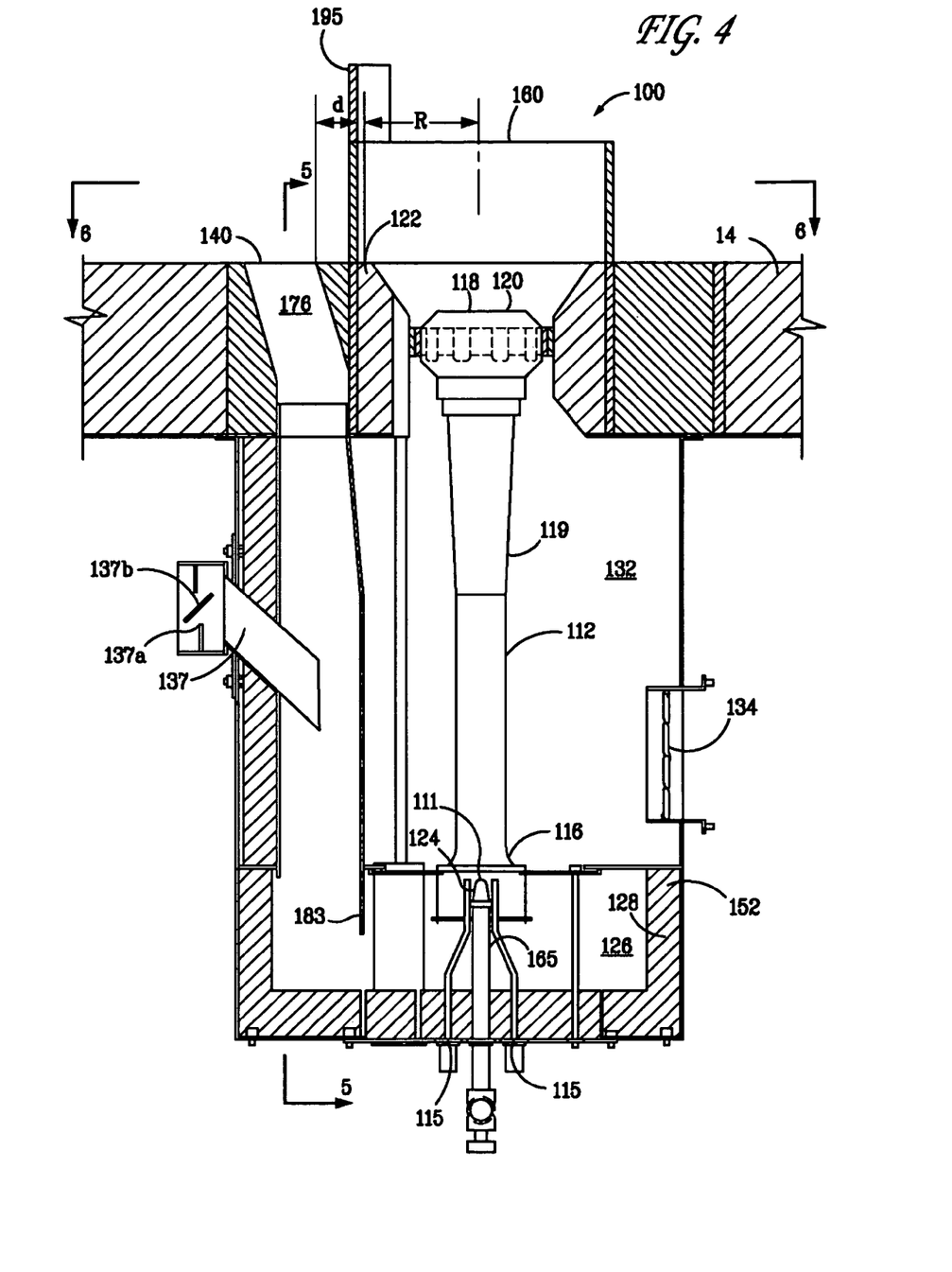
FIG. 4 illustrates an elevation partly in section of a burner of the type illustrated in FIG. 3.
Figure 5:
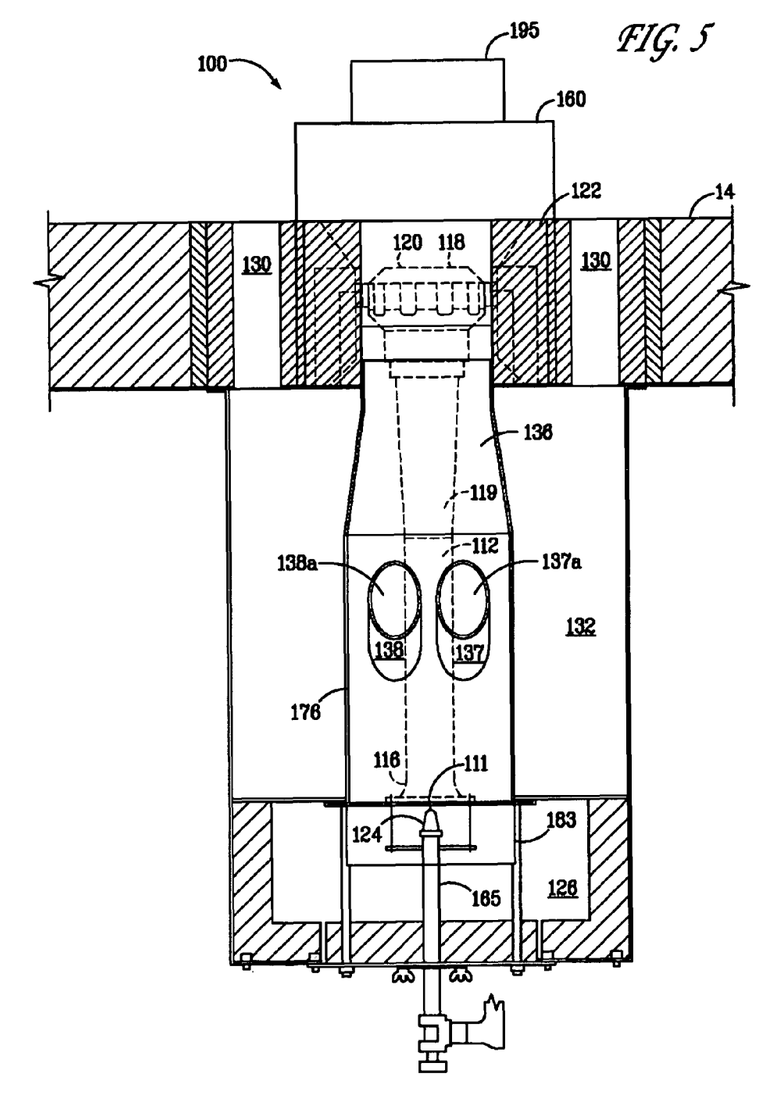
FIG. 5 is an elevation partly in section taken along line 5-5 of FIG. 4.
Figure 6:
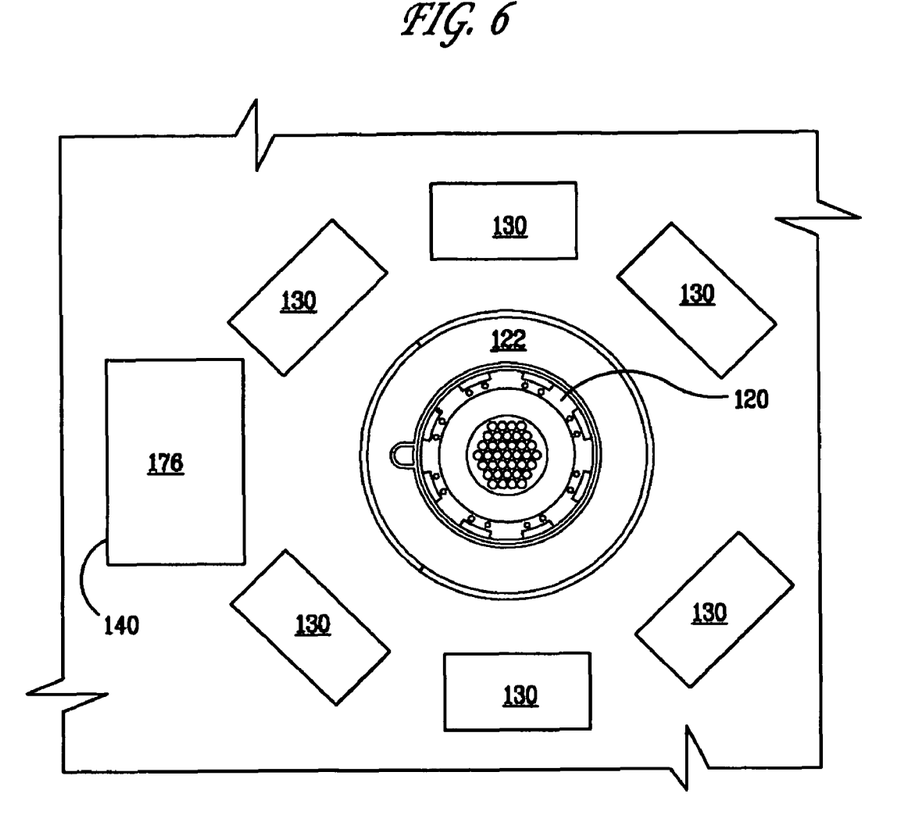
FIG. 6 is a plan view taken along line 6-6 of FIG. 4.

An exemplary form of a premix staged air burner 100 capable of producing the tall steady flames beneficial in the furnaces and methods disclosed herein is illustrated in FIGS. 4-6. Burner 100 includes a freestanding burner tube 112 located in a furnace floor 14, or such as in a burner well in floor 14. The burner tube 112 includes an upstream end 116, a downstream end 118 and a venturi portion 119. A burner tip 120 is located at the downstream end 118 and is surrounded by an annular tile 122. A fuel orifice 111, which may be located within fuel spud 124, is located at the top end of a gas fuel riser 165 and is located at the upstream end 116 of tube 112 and introduces fuel into the burner tube 112. Fresh or ambient air is introduced into a primary air chamber 126 through an adjustable damper 137b to mix with the fuel at the upstream end 116 of the burner tube 112 and pass upwardly through the venturi portion 119. Combustion of the fuel and fresh air occurs downstream of the burner tip 120.

A plurality of air ports 130 (see FIGS. 5 and 6) originate in a secondary air chamber 132 and pass through the furnace floor 14 into the furnace 10. Fresh or ambient air enters the secondary air chamber 132 through adjustable dampers 134 and passes through the staged air ports 130 into the furnace to provide secondary or staged combustion.

In order to recirculate flue gas from the furnace to the primary air chamber, FGR duct 176 extends from opening 140, in the floor of the furnace 14 into the primary air chamber 126. Flue gas is drawn through FGR duct 176 by the inspirating effect of fuel passing through venturi 119 of burner tube 112. In this manner, the primary air and flue gas are mixed in primary air chamber 126, which is prior to the zone of combustion. Therefore, the amount of inert material mixed with the fuel is raised, thereby reducing the flame temperature, and as a result, reducing $NO_x$ emissions. Closing or partially closing damper 137b restricts the amount of fresh air that can be drawn into the primary air chamber 126 and thereby provides the vacuum necessary to draw flue gas from the furnace floor 14.

In one form, mixing may be promoted by providing two or more primary air channels 137 and 138 protruding into the FGR duct 176. The channels 137 and 138 are conic-section, cylindrical, or squared and a gap may be provided between each channel 137 and 138 to produce a turbulence zone in the FGR duct 76 where good flue gas/air mixing occurs.

Mixing may be further enhanced by a plate member 183 at the lower end of the inner wall of the FGR duct 176. The plate member 183 extends into the primary air chamber 126. The plate member 183 also makes the FGR duct 76 effectively longer, and a longer FGR duct also promotes better mixing.

Unmixed low temperature ambient air (primary air), is introduced through angled channels 137 and 138, each having a first end comprising an orifice 137a and 138a, controlled by damper 137b, and a second end comprising an orifice which communicates with FGR duct 176. The ambient air so introduced is mixed directly with the recirculated flue gas in FGR duct 176. The primary air is drawn through channels 137 and 138, by the inspirating effect of the fuel passing through the fuel orifice, which may be contained within gas spud 124. The ambient air may be fresh air as discussed above.

Advantageously, a mixture of from about 20% to about 80% flue gas and from about 20% to about 80% ambient air should be drawn through FGR duct 176. It is particularly preferred that a mixture of about 50% flue gas and about 50% ambient air be employed. The geometry and location of the air ports and bleed air ducts may be varied to obtain the desired percentages of flue gas and ambient air.

In operation, fuel orifice 111, which may be located within gas spud 124, discharges fuel into burner tube 112, where it mixes with primary air, recirculated flue gas or mixtures thereof. The mixture of fuel, recirculated flue-gas and primary air then discharges from burner tip 120. The mixture in the venturi portion 119 of burner tube 112 is maintained below the fuel-rich flammability limit; i.e. there is insufficient air in the venturi to support combustion. Secondary air is added to provide the remainder of the air required for combustion.

In addition to the use of flue gas as a diluent, another technique to achieve lower flame temperature through dilution is through the use of steam injection. Steam can be injected in the primary air or the secondary air chamber. Steam may be injected through one or more steam injection tubes 115, as illustrated in FIG. 4. Preferably, steam is injected upstream of the venturi.

Still referring to FIGS. 4-6, a wall 160 may be provided that encircles the burner tip 120 mounted on the downstream end 118 of the burner tube 112 to provide a barrier between a base of a flame downstream of the burner tip 120 and both FGR duct 176 in the furnace and one or more air ports 130. In one form, a partial wall 195 is provided in addition to wall 160, to provide a further barrier between a base of a flame downstream of the burner tip 120 and FGR duct 176.

In operation of the furnace 10 disclosed herein, it is desirable to make the transition from the single decoke effluent line 30 to the plurality of decoke effluent injection nozzles 24 by passing the effluent through a series of symmetrical dividing lines. In this manner, the coke contained in the decoke effluent stream is distributed among the various injection nozzles 24. Therefore, in one form, decoke effluent distribution piping 30 is provided to more evenly distribute coke among the plurality of decoke effluent injection nozzles 24.

Although the invention has been described with reference to particular means, materials and forms, it is to be understood that the invention is not limited to the particulars disclosed and extends to all equivalents within the scope of the claims.

What is claimed is:

1. A furnace for the cracking of hydrocarbons, comprising:
    (a) a radiant firebox, said radiant firebox comprising a furnace floor having a centerline;
    (b) a plurality of decoke effluent injection nozzles mounted along or adjacent to said centerline for injecting decoke effluent upward into said radiant firebox;
    (c) a plurality of burners arranged to form a first line of burners and a second line of burners, each line of burners positioned on opposing sides of said plurality of decoke effluent injection nozzles;
    (d) a first plane of radiant coils spaced at a distance greater than the distance that said first line of burners is spaced from said centerline of said furnace floor and on the same side of said centerline as said first row of burners; and
    (e) a second plane of radiant coils spaced at a distance greater than the distance that said second line of burners is spaced from said centerline of said furnace floor and on the same side of said centerline as said second row of burners.

2. The furnace of claim 1, wherein said plurality of burners is arranged along at least two parallel lines to form a first line of burners and a second line of burners, each line of burners spaced a substantially equal distance from said centerline of said furnace floor and on opposing sides of the centerline.

3. The furnace of claim 1, further comprising a second plurality of burners arranged along at least two parallel lines to form a third line of burners and a fourth line of burners, each line of burners spaced a substantially equal distance from said centerline of said furnace floor at a distance greater than said distance that said first plane of radiant coils and said second plane of radiant coils are spaced from said centerline of said furnace floor, respectively.

4. The furnace of claim 1, wherein said first plane of radiant coils is arranged parallel to a plane passing through said centerline of said furnace floor and perpendicular to said furnace floor.

5. The furnace of claim 1, wherein said second plane of radiant coils is arranged parallel to a plane passing through said centerline of said furnace floor and perpendicular to said furnace floor.

6. The furnace of claim 1, further comprising decoke effluent distribution piping to distribute coke among said decoke effluent injection nozzles.

7. The furnace of claim 1, wherein said plurality of burners comprises raw gas burners, staged-fuel burners, staged air burners, premix staged air burners or combinations thereof.

8. The furnace of claim 7, wherein said plurality of burners comprises premix staged air burners.

9. The furnace of claim 8, wherein said premix staged air burners of said plurality of burners each comprises:
    (a) a primary air chamber;
    (b) a burner tube having an upstream end, a downstream end and a venturi intermediate said upstream and downstream ends;
    (c) a burner tip mounted on the downstream end of said burner tube adjacent a first opening in the furnace, so that combustion of the fuel takes place downstream of said burner tip; and
    (d) a fuel orifice located adjacent the upstream end of said burner tube, for introducing fuel into said burner tube.

10. The furnace of claim 1, wherein the furnace is a steam cracking furnace.

11. A method for incinerating a decoke effluent stream of a furnace for the production of ethylene, the furnace including (i) a radiant firebox having a furnace floor, the furnace floor having a centerline, (ii) a plurality of decoke effluent injection nozzles mounted along or adjacent to the centerline for injecting decoke effluent upward into the radiant firebox (iii) a plurality of burners arranged to form a first line of burners and a second line of burners, each line of burners positioned on opposing sides of the plurality of decoke effluent injection nozzles; (iv) a first plane of radiant coils spaced at a distance greater than the distance that the first line of burners is spaced from the centerline of the furnace floor and on the same side of the centerline as the first row of burners; (v) a second plane of radiant coils spaced at a distance greater than the distance that the second line of burners is spaced from the centerline of the furnace floor and on the same side of the centerline as the second row of burners; the method comprising the step of:
    (a) injecting decoke effluent upward into the radiant firebox along the centerline of the furnace floor.

12. The method of claim 11, wherein the plurality of burners is arranged along at least two parallel lines to form a first line of burners and a second line of burners, each line of burners spaced a substantially equal distance from the centerline of the furnace floor and on opposing sides of the centerline.

13. The method of claim 11, wherein the plurality of decoke effluent injection nozzles inject decoke effluent upward substantially along the plane passing through the centerline of the furnace floor and perpendicular to the furnace floor.

14. The method of claim 11, wherein the furnace further includes a second plurality of burners arranged along at least two parallel lines to form a third line of burners and a fourth line of burners, each line of burners spaced a substantially equal distance from the centerline of the furnace floor at a distance greater than the distance that the first plane of radiant coils and the second plane of radiant coils are spaced from the centerline of the furnace floor, respectively.

15. The method of claim 11, wherein the furnace further includes decoke effluent distribution piping to distribute coke among the decoke effluent injection nozzles.

16. The method of claim 11, wherein the plurality of burners includes raw gas burners, staged-fuel burners, staged air burners, premix staged air burners or combinations thereof.

17. The method of claim 16, wherein the plurality of burners comprises premix staged air burners.

18. The method of claim 17, further comprising the steps of:
(b) combining fuel gas and air, flue gas or mixtures thereof at a predetermined location adjacent a fuel spud within each of the plurality of burners;
(c) discharging the fuel gas and air, flue gas or mixtures thereof at a burner tip downstream of the predetermined location, the burner tip peripherally surrounded by a tile;
(d) for each of the plurality of burners drawing a stream of flue gas from the furnace in response to the inspirating effect of uncombusted fuel gas exiting the fuel spud; and
(e) combusting the fuel gas downstream of the burner tip downstream of the predetermined location.

19. The method of claim 18, wherein the furnace is a steam-cracking furnace.

20. The method of claim 11, wherein the first plane of radiant coils is arranged parallel to a plane passing through the centerline of the furnace floor on a first side of the centerline and perpendicular to the furnace floor and the second plane of radiant coils is arranged parallel to a plane passing through the centerline of the furnace floor on a side opposite of the first side of the centerline and perpendicular to the furnace floor.

* * * * *